June 5, 1934.  R. S. SANFORD  1,961,830

BRAKE

Filed Jan. 15, 1931

INVENTOR.
ROY S. SANFORD
BY
ATTORNEY

Patented June 5, 1934

1,961,830

UNITED STATES PATENT OFFICE 1,961,830

BRAKE

Roy S. Sanford, South Bend, Ind., assignor to Bendix Brake Company, South Bend, Ind., a corporation of Illinois Application January 15, 1931, Serial No. 508,946

6 Claims. (Cl. 188—78)

This invention relates to brakes and is illustrated as embodied in an internal expanding automobile brake of the shiftable-anchorage type.

An object of the invention is to provide a self-balancing applying device for the brake which can shift, for example to permit the shifting of the anchorage, and which is preferably operated in such a manner that the brake applying force has no tendency to cause such shifting. In one desirable arrangement this is accomplished by transmitting the brake applying force through two elements, one of which is in tension and the other of which is in compression, so that the two components substantially balance each other so far as concerns any tendency to cause shifting of the brake applying device. This is particularly advantageous in transmitting to the brake friction means the applying force of an operating shaft carried by the brake and which is journaled in a fixed bearing (i. e. which has a fixed axis).

Figure 1:
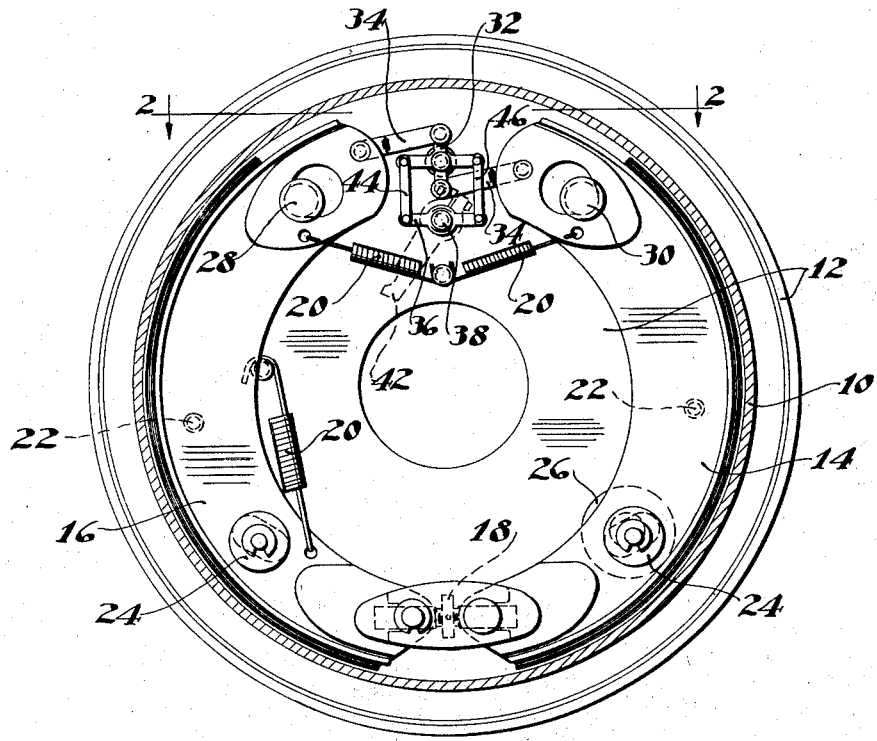
Figure 2:
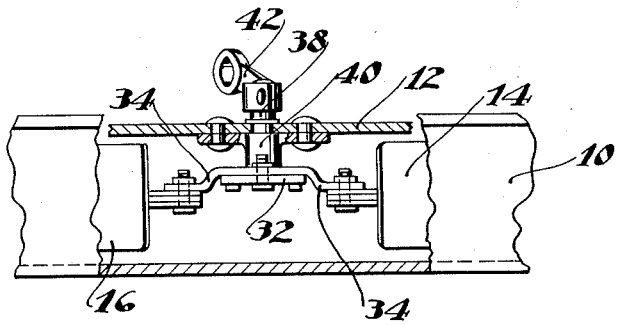

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, and showing the friction means in side elevation; and Figure 2 is a partial section on the line 2—2 of Figure 1 and showing the applying means in top plan.

The brake selected for illustration comprises a rotatable drum 10, at the open side of which is a suitable support such as a backing plate 12, the drum and backing plate constituting a substantially closed brake chamber housing the brake friction means. The illustrated friction means is of the shiftable-anchorage type, although this is not an essential feature of the invention, and may comprise a pair of shoes 14 and 16 connected by an adjustable floating joint 18 and urged away from the brake drum by three return springs 20 connected between the shoes and the backing plate. The springs 20, being inclined from the shoe webs to the backing plate, have components urging the shoes toward the backing plate in positions which may be determined by suitable stops 22 carried by the backing plate and engaging the rear faces of the webs of the shoes. The shoes may also be provided with suitable steady rests 24 of any desired form, and there is shown also a positioning roller 26 rotatably mounted on an eccentric pivot carried by the backing plate and engaging the inner face of the shoe rim to position the shoe 14 when the brake is released. The torque of the brake is taken by an anchor 28 when the drum is turning clockwise and by an anchor 30 when the drum is turning counter-clockwise, the two anchors being mounted on the backing plate of the brake and extending through elongated openings in the webs of the brake shoes.

One of the principal features of the present invention relates to the applying means, the form illustrated in the drawing being especially adapted for the shiftable-anchorage brake described above, but being readily adaptable for other types of brakes. In the arrangment shown, there is a shiftable and self-balancing applying device 32 having four arms, the upper and lower arms being connected by means such as links 34 to the adjacent ends of the shoes 14 and 16. The oppositely extending horizontal arms of the applying device or rock member 32 are arranged to parallel corresponding arms 36 fixed on the inner end of a shaft 38 journaled in a bearing 40 carried by the backing plate and operated by means such as a lever 42 outside the backing plate. The corresponding arms of the rock member or applying device 32 and of the parallel arms 36 are connected by two links, one of which, a link 44, is in tension in applying the brake, and the other of which, a link 46, is in compression in applying the brake.

It will be seen that the balancing of the tension on the link 44 against the compression on the link 46 leaves no force tending to shift the applying device 32, while at the same time, the latter is rocked to apply the brake when the shaft 38 is turned about its fixed axis. The four links 34—44—46 also form a support for the applying device 32 which permit it to shift its position to balance the forces on the two brake shoes.

While one illustrative embodiment of the invention has been described in detail, it is not my intention to limit its scope to that particular embodiment or otherwise than by the terms of the appended claims.

I claim:

1. A brake comprising friction means having adjacent separable ends, in combination with a shiftable and self-balancing rock member acting on said ends to force them apart to apply the brake, a shaft having a fixed axis paralleling the axis of the rock member and arranged radially of the brake inside said rock member, and means operated by the shaft for rocking said member and which has no force component tending to shift it and which means also serves as a movable support for said member.

2. A brake comprising friction means having adjacent separable ends, in combination with a shiftable and self-balancing rock member acting on said ends to force them apart to apply the brake, a shaft having a fixed axis, and means arranged between said ends and operated by the shaft and rocking said member by tension and compression forces which balance each other.

3. A brake comprising friction means shiftable from one anchorage to another anchorage, an applying device acting on the friction means and shifting therewith to permit the shifting of the anchorage, and operating means for the applying device connected thereto by tension and compression elements arranged between said anchorages.

4. A brake comprising friction means having separable ends, in combination with a floating leverage device linked to said ends and having oppositely-extending arms, an operating device having arms paralleling the oppositely-extending arms, and a link connecting each arm of the operating device with the corresponding arm of the leverage device, said devices being arranged between said separable ends.

5. A brake comprising friction means having separable ends, in combination with a floating leverage device having four arms, links connecting two of the arms to said ends, an operating device having arms paralleling the remaining two arms, and a link connecting each arm of the operating device with the corresponding remaining arm of the leverage device.

6. A brake comprising friction means having separable ends, in combination with a floating leverage device having four arms, links connecting two of the arms to said ends, an operating device having arms paralleling the remaining two arms, and a link connecting each arm of the operating device with the corresponding remaining arm of the leverage device, the leverage device being supported by the four links.

ROY S. SANFORD.